US012137319B2

(12) United States Patent
Chagas et al.

(10) Patent No.: US 12,137,319 B2
(45) Date of Patent: Nov. 5, 2024

(54) EMBODIED SOUND DEVICE AND METHOD

(71) Applicant: The Regents of the University of California, Oakland, CA (US)

(72) Inventors: Paulo C. Chagas, Riverside, CA (US); Ethan Castro, Agoura Hills, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 17/765,401

(22) PCT Filed: Jan. 7, 2021

(86) PCT No.: PCT/US2021/012522
§ 371 (c)(1),
(2) Date: Mar. 30, 2022

(87) PCT Pub. No.: WO2021/142136
PCT Pub. Date: Jul. 15, 2021

(65) Prior Publication Data
US 2022/0337937 A1   Oct. 20, 2022

Related U.S. Application Data

(60) Provisional application No. 62/958,218, filed on Jan. 7, 2020, provisional application No. 62/958,189, filed on Jan. 7, 2020.

(51) Int. Cl.
*H04R 1/24* (2006.01)
*H04R 1/02* (2006.01)
(Continued)

(52) U.S. Cl.
CPC .................. *H04R 1/24* (2013.01); *H04R 1/02* (2013.01); *H04R 1/2807* (2013.01); *H04R 3/14* (2013.01);
(Continued)

(58) Field of Classification Search
CPC .......... H04R 1/24; H04R 1/02; H04R 1/2807; H04R 3/14; H04R 2201/028; H04R 2400/03; H04R 2430/03; H04R 2460/13
(Continued)

(56) References Cited

U.S. PATENT DOCUMENTS

| 5,101,810 A | 4/1992 | Skille et al. |
| 8,638,966 B2 | 1/2014 | Taylor et al. |

(Continued)

FOREIGN PATENT DOCUMENTS

| CN | 1299841 C | 2/2007 |
| JP | 4317957 B2 | 8/2009 |

(Continued)

OTHER PUBLICATIONS

International Application Serial No. PCT/US2021/012522, International Search Report mailed Apr. 2, 2021, 2 pgs.
(Continued)

*Primary Examiner* — Norman Yu
(74) *Attorney, Agent, or Firm* — SCHWEGMAN LUNDBERG & WOESSNER, P.A.

(57) ABSTRACT

A tactile audio system and associated methods are disclosed. In one example, the tactile audio system includes a signal processor configured to separate an input signal into a transient group and a sustained group. In one example, the tactile audio system includes a signal processor configured to separate an input signal into a plurality of frequency bands for each of the transient group and the sustained group. A number of transducers are provided to generate a tactile response corresponding to portions of the separated audio signal.

13 Claims, 8 Drawing Sheets

(51) Int. Cl.
*H04R 1/28* (2006.01)
*H04R 3/14* (2006.01)

(52) U.S. Cl.
CPC .... *H04R 2201/028* (2013.01); *H04R 2400/03* (2013.01); *H04R 2430/03* (2013.01); *H04R 2460/13* (2013.01)

(58) Field of Classification Search
USPC ... 381/151, 326, 186, 182, 312, 98, 74, 120, 381/23.1, 191, 94.3, 339, 372
See application file for complete search history.

(56) References Cited

U.S. PATENT DOCUMENTS

| | | | |
|---|---|---|---|
| 8,761,417 B2 | 6/2014 | Oser et al. | |
| 10,152,296 B2 | 12/2018 | Trestain | |
| 2007/0039777 A1* | 2/2007 | Whitaker | H04R 1/025 181/150 |
| 2007/0121955 A1* | 5/2007 | Johnston | H04S 7/301 381/61 |
| 2007/0183605 A1* | 8/2007 | Yoshino | H04R 3/12 381/59 |
| 2010/0232623 A1* | 9/2010 | Martin | H04R 29/001 381/96 |
| 2012/0051579 A1 | 3/2012 | Cohen | |
| 2012/0313765 A1* | 12/2012 | Oser | H04R 5/023 340/407.1 |
| 2013/0073295 A1 | 3/2013 | Johnson | |
| 2013/0202134 A1 | 8/2013 | Afshar | |
| 2017/0325039 A1* | 11/2017 | Khwaja | H04R 29/001 |
| 2019/0082267 A1 | 3/2019 | Alexiou et al. | |
| 2019/0261088 A1 | 8/2019 | Sheffield | |
| 2020/0020349 A1* | 1/2020 | Disch | G10L 21/0224 |

FOREIGN PATENT DOCUMENTS

| | | |
|---|---|---|
| WO | WO-2015031684 A1 | 3/2015 |
| WO | WO-2016147170 A1 | 9/2016 |
| WO | WO-2018177608 A1 | 10/2018 |

OTHER PUBLICATIONS

International Application Serial No. PCT/US2021/012522, Written Opinion mailed Apr. 2, 2021, 6 pgs.
International Application Serial No. PCT/US2021/012522, International Preliminary Report on Patentability mailed Jul. 21, 2022, 8 pgs.

* cited by examiner

EMBODIED SOUND DEVICE AND METHOD

CLAIM OF PRIORITY

This application is a U.S. National Stage Filing under 35 U.S.C. 371 from International Application No. PCT/US2021/012522, filed on Jan. 7, 2021, and published as WO 2021/142136 A1 on Jul. 15, 2021, which claims the benefit of priority to U.S. Provisional Patent Application Ser. No. 62/958,189, filed on Jan. 7, 2020, and to U.S. Provisional Patent Application Ser. No. 62/958,218, filed on Jan. 7, 2020, each of which is incorporated by reference herein in its entirety.

TECHNICAL FIELD

Embodiments described herein generally relate to audio systems, components, and methods.

BACKGROUND

Over 1 in 10 persons have a hearing loss. Only surpassed by arthritis and heart disease, hearing loss is the third most prevalent health issue in older adults. It may vary from mild to profound, but every age group experiences a fair amount of hearing loss. The cause behind losing one's hearing before an advanced age can range from exposure to loud noises—the concerts from youth, a loud movie, a car crash—to simply being born without the ability to hear due to congenital effects (CDC). Hearing loss impacts nearly every element of the human experience: physical health, emotional and mental health, social skills, self-esteem, and more. It is desired to have methods and devices that provide an audio experience for those with hearing loss, as well as enhance an audio experience for others with minimal or no hearing loss.

DESCRIPTION OF EMBODIMENTS

Figure 1:
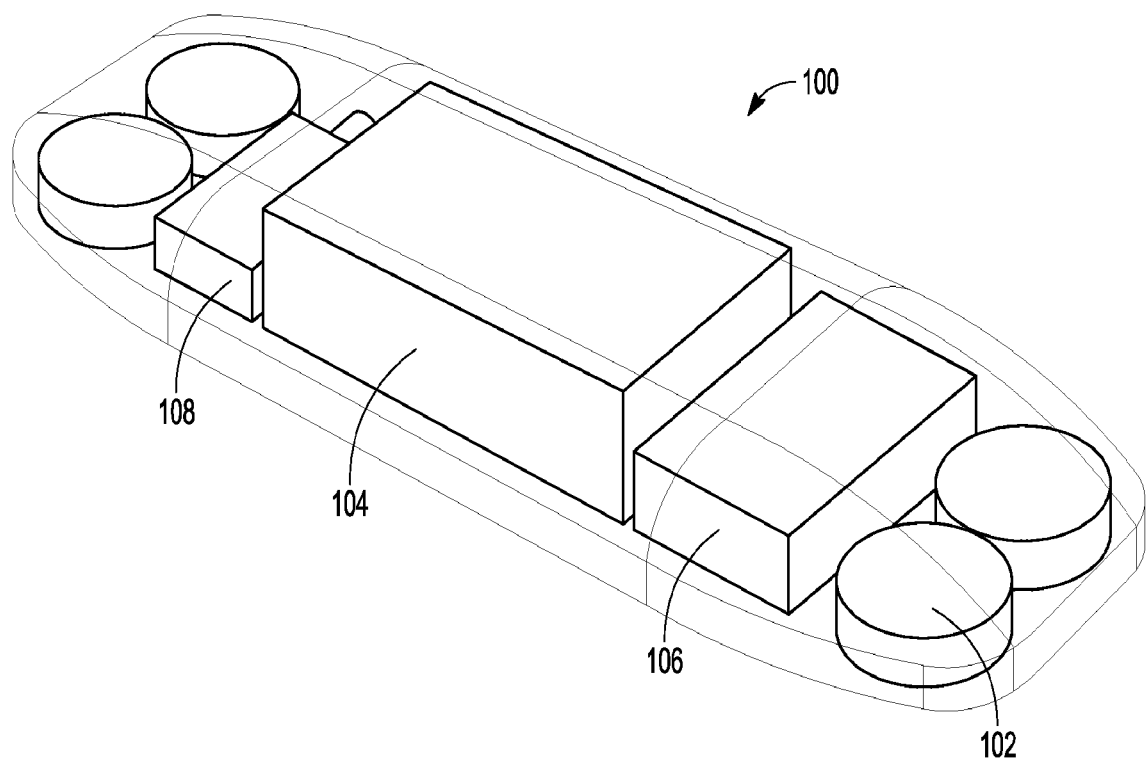
FIG. 1 shows a component of a tactile audio system in accordance with some example embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Example systems and methods in the present disclosure help those with hearing impairment to experience music in high-fidelity, and can help those without impairment to get closer to music, without further damaging ears. This idea was made possible by advances in bone conduction, signal processing, sonic excitation and tactile transducer technologies.

Existing solutions have a number of drawbacks associated with them that are overcome by example systems and methods of the present disclosure.

High-Fidelity (Hi-Fi) hearing aids are nothing new, they allow for wider frequency ranges and much larger dynamic ranges (speech is somewhere between 35-55 decibels (dB) in dynamic range as opposed to a rock concert that can be up to 120 dB). These types are more suitable for music than older hearing aid models, but use existing air-driver technology which can further damage eardrums if turned up to a preferred level.

Aftershokz—A headphone company with proprietary patents which enables bone-conduction sound via small transducers placed on the cheekbones. Bone conduction devices allow sound perception to happen without blocking the ear canal, allowing for outside world sounds to enter the ear, uninterrupted. However, this solution does not provide good response at lower frequencies.

Cochlear—A company focused on implantable hearing devices including the Cochlear implant, Baha bone conduction sound processors, and Carina middle ear implants. This solution is expensive, and invasive in comparison to examples of the present disclosure.

Currently, the only way for someone with hearing impairment to experience music, is to turn up the volume loud enough to feel the speakers shaking. This causes further hearing damage, and can disturb many others, while not actualizing the visceral feeling the listener is looking for.

What is disclosed is a platform based on tactile reproduction of sound—sound you can feel, as well as hear. We discovered that the tactile panel setup actually performed quite well in reproducing most audible frequencies, and with slight adjustments of either material and/or shape, we could adjust the resonant sonic characteristics of the device to taste. Example systems and methods disclosed allow users to interact with their favorite songs in a whole new perspective—via touch.

Tactile audio can provide a different embodied experience:

1) The user can have an embodied experience, physically interacting with sound.

2) Resonant materials can be touched and felt. This provides a myriad of uses from entertainment to therapeutic.

3) Resonant materials provide more dynamic range with less compression. This is good for dynamic instruments such as drums.

4) Large surfaces can be used in interactive entertainment environments such as theme parks, movie theaters, or hazardous environments (e.g. water park).

5) Can be installed in walls to have an 'invisible speaker' effect.

6) Can introduce sonic experience in unconventional places such as a tilted drafting desk.

7) Heightened immersivity in 4D+ entertainment experiences—the body can experience the stimulus that is presented.

In one example, a sound signal (music, microphone, etc.) is amplified via an audio amplifier, and sent to tactile transducers. In one example, transducers are voice coils that are not attached to a cone to drive air. Instead, the transducers have a small mass that is attached (e.g. via adhesive or other mounting method) to a resonant material that is ideally stiff, lightweight, and mildly flexible at extremities. The mass oscillates which transfers energy to the resonant material, which naturally amplifies certain frequencies due to the resonate nature of the material and the shape the device takes, and transmits the resulting vibrations to the air waves, to be heard, or via touch.

This concept can be scalable from a small personal resonant box, to a large platform that can support multiple people. We have developed a relatively compact device design that will contain all necessary components for full-frequency tactile reproduction and immersive entertainment consumption. FIG. 1 shows an example system 100 for use in a tactile audio system. In the example shown, system 100 includes four exciters 102, an audio processing device 104, frequency splitter 106, and amplifier 108.

Figure 2:
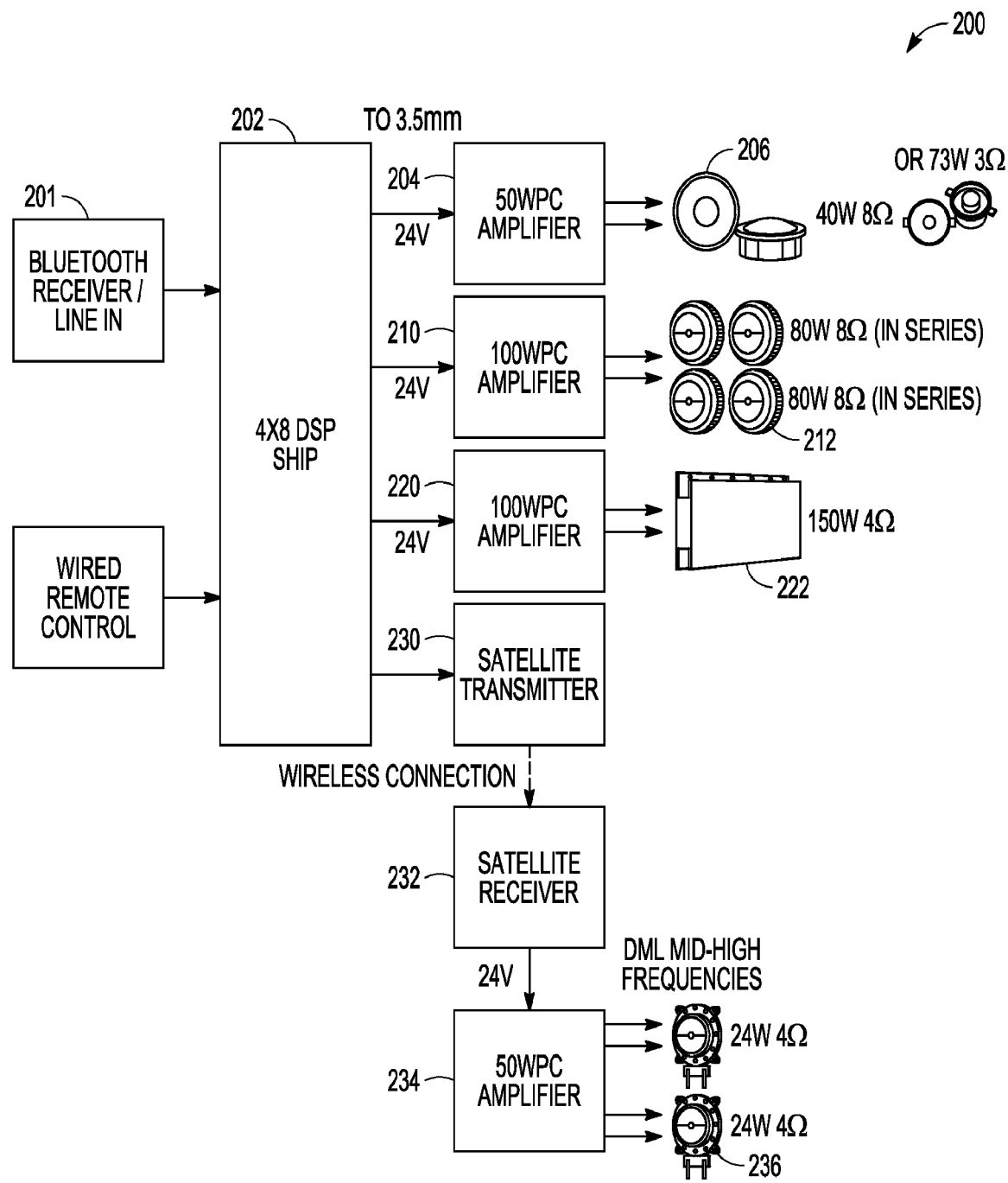
FIG. 2 shows a diagram of a tactile audio system in accordance with some example embodiments.

FIG. 2 shows a diagram of one example tactile audio system 200 using one or more convertors such as system 100 from FIG. 1. The system 200 includes an example audio processing device that includes a digital signal processor (DSP) 202 that is coupled to input 201. In the example shown, the DSP 202 divides the audio into a number of frequency bands. In the example, of FIG. 2, four frequency bands are shown. A first amplifier 204 is assigned to the first frequency band, and passes on an amplified signal to first transducers 206. A second amplifier 210 is assigned to the second frequency band, and passes on an amplified signal to second transducers 212. A third amplifier 220 is assigned to the third frequency band, and passes on an amplified signal to third transducers 222. In one example, one or more frequency bands may be transmitted wirelessly. FIG. 2 shows the fourth amplifier 234 receiving input from a transmitter 230 that communicates with a fourth receiver 232 and in turn to fourth amplifier 234.

In one example involving a rear-mounted system, the Computation Audio Processing 202 applies to the source audio 201 as follows:

Computational instructions will check if the source audio received is 2.0 stereo sound or a surround format to determine how to route the audio channels. If it is 2.0 stereo sound, it will crossover the frequencies directly in the filtering stage, reproducing the full frequency signal. If it is a surround sound format, the computational instructions will separate and process the left and right rear surround channels from a 5.1 format, or a combination of the surround channels from a 7.1 format, plus the unprocessed Low Frequency Emitting (LFE) bass channel if there is any (The LFE channel will not be processed through filtering stage unless forced into Stereo 2.0 mode). For example, if the source audio was originally in 5.1 surround sound format, the computational instructions will only deal with the rear left and right speaker audio plus the 1 LFE channel, and pass the remaining channels to an external audio system that would reproduce the non-surround channels normally.

For each speaker channel (Left and Right) the audio will undergo digital signal processing, such as transient detection and extraction. "Transient" sounds are short bursts of audio with a relatively high amplitude in the onset. Examples of transient audio are drum beats and gunshots. The computational instructions will determine if there are transient sounds in the audio based on the above description, and will trigger the separation process on the detected transient sounds. Transient sounds will be separated from the "sustained" sounds in the audio source. "Sustained" sounds are defined as 'sounds that continue or are prolonged for an extended period or without interruption'. Examples of sustained sounds are ambient noise or any instrument that requires air to initiate sound (brass or pipe organ). The computational instructions will determine if there are sustained sounds in the audio based on the above description, and will preserve the detected sustained sounds from the transient extraction process. At the end of transient detection and extraction, sounds will be assigned into "Transient" and "Sustained" groups for each speaker channel. Each assigned group will be able to adjust the individual volumes of the different frequency bandwidth ranges in the next step.

The "Transient" sound group and the "Sustained" sound group for each speaker will be each divided into four frequency response categories: High, High-Mid, Low-Mid, and Low/Sub. "High" frequencies are frequencies around 5000 Hz and beyond. "High-Mid" frequencies are frequencies around 800-5000 Hz. "Low-Mid" frequencies are frequencies around 250-800 Hz. "Low/Sub" frequencies are frequencies around 5-250 Hz.

The volume for each frequency response category from both groups is adjusted by a DSP (digital signal processor). This can be adjusted manually post-install. For example, if a user were to enhance vibratory experience from the explosions in their video game, they could increase the volume in the "Low/Sub" category in the "Transient" group. On the other hand, if the same user wanted to drown out the droning of rainfall in the game, they could turn down the "High-Mid" volume in the "Sustained" group. After the volume adjustment of each frequency range is applied, the output of the DSP will be sent to the respective tactile drivers for each category. In an example system, there are two groups of drivers: One for Transient sound and one for Sustained sound. For each group, there is a driver for each of the four frequency range categories (High, High-Mid, Low-Mid, Low/Sub). 4 drivers per group×2 groups per speaker×2 speakers=16 drivers total. For example, the adjusted volume output of the "Low/Sub" category of the "Transient" group of the Left speaker will be heard from the "Low/Sub" driver from the "Transient" group of the Left speaker.

In one example, computational instructions in one or more of the systems disclosed further include one or more sensors to provide feedback and facilitate adjustment of resonance in an object or panel that transducers or exciters are coupled to. Sensor examples include, but are not limited to, piezo sensors, MEMS sensors, traditional microphones, vibration sensors, etc. In one example, an input signal is passed through unprocessed at an initial operation. When a calibration cycle begins, an impulse response is played through one or more transducers, and captured using sensors. An initial frequency response of data is plotted against a target response. One example of a target response includes a flat response of total frequency capabilities of hardware being implemented—useful for critical audio situations. In one example, Filters are then calculated between the initial frequency response captured and the target frequency response. In one example, the filter is an inverse filter. Other filter modes are also within the scope of the invention. In one example, inverse filters are applied via software at line level to an output signal before amplification to tactile transducers.

While we are using a sensory experience that is fundamentally different than traditional sound equipment (touch versus hearing), ultimately it will be entering a similar field and can be compared to traditional air drivers, although a caveat remains to consider the range of ability this technology has.

1) Our sound system designs are more efficient at producing a balanced reproduction of a large frequency range in near-field or direct touch applications at the same power rating.

2) Compared to near field monitors of the same power rating, our distributed mode loudspeaker (DML) design has a larger area of off-axis frequency accuracy which is desirable for untreated listening rooms, and allows for great acoustic performance without precise placement.

3) Bass module can provide lower frequencies at more powerful levels, while being more efficient at a fraction of the cost.

4) Less negative side effects of listening to music for extended periods of time. Wider dispersion of sound means less hearing damage.

5) Unlocks ability to perceive frequencies previously lost due to hearing damage/auditory issues.

Two example modes that may be used alone, or combined include: 1) an interactive sound room, where listeners can touch interactive materials, and 2) an immersive mobile system, where the listener is wearing materials which retain the ability to transmit micro-vibrations to the body, resulting in intelligible sound. Both systems may be converted into a hybrid system, incorporating traditional speaker components, in order to augment the immersion experience of the environment as a whole.

Sound Room:

In one example, a high-fidelity sound room uses several high-mid range tactile transducers, called exciters, with multiple low-end tactile transducer elements, called bass shakers to achieve a high-fidelity tactile experience. When these transducers are affixed to a structure, the structure will provide a visceral embodied experience that users can touch and interact sound vibrations in speech and music. In one example, this system processes the signal with a computational audio processing unit, to give a more realistic sound impression across audible frequency range.

Hybrid Sound Room

This tactile system can be augmented with a traditional speaker array in order to balance out difficult frequencies, and to demonstrate pure tactile experience against traditional speaker (plus subwoofer) setup.

Mobile:

In one example, a mobile system is provided that can be worn as the user moves about. The mobile system consists of a wearable high-frequency tactile transducers, such as a bone-conduction headset, worn just over the front of the ears, or exciters pressed against a user's body, in addition to a wearable low-frequency tactile transducer, worn on the chest/back. Like the sound room, this mobile rig is processed via computational audio processing in order to achieve a tactile, tonal balance with an extended bass response. In one example, the mobile system is combined with augmented reality (AR) to provide a high quality, immersive tactile experience to their project.

Hybrid Mobile Rig:

The tactile system can be augmented with a pair of traditional in-ear drivers (4 channels total) to provide a fully-immersive reality, suitable for true mobile multichannel virtual reality (VR).

Multichannel/Ambisonics Integration:

In one example, a system can reproduce multichannel media (multiple discrete channels of audio) with four discrete channels of audio from a media example—for example a movie with surround sound, or multichannel music prepared for multichannel surround sound systems.

Figure 3:
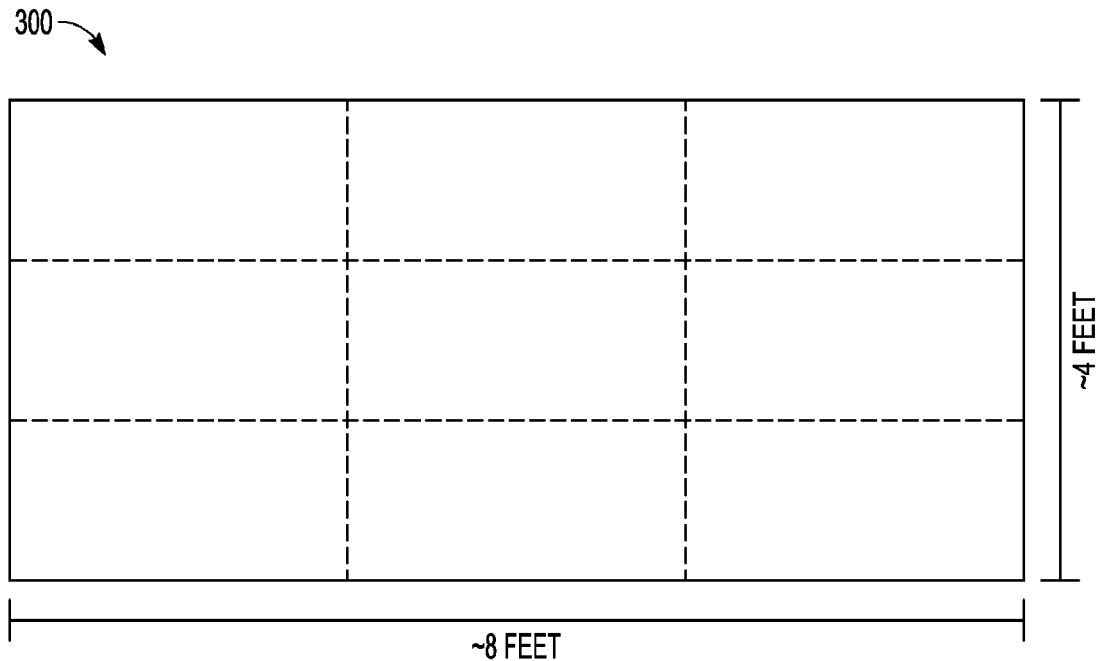
FIG. 3 shows components of a tactile audio system in accordance with some example embodiments.

FIG. 3 shows a panel 300 that may be equipped with a system as described in the present disclosure. In one example, the panel 300 may be integrated into a room environment, for example, a floor panel, ceiling panel, wall panel, free standing partition panel, etc. A 4'×8' dimension is shown as an example, however, the invention is not so limited.

Figure 4:
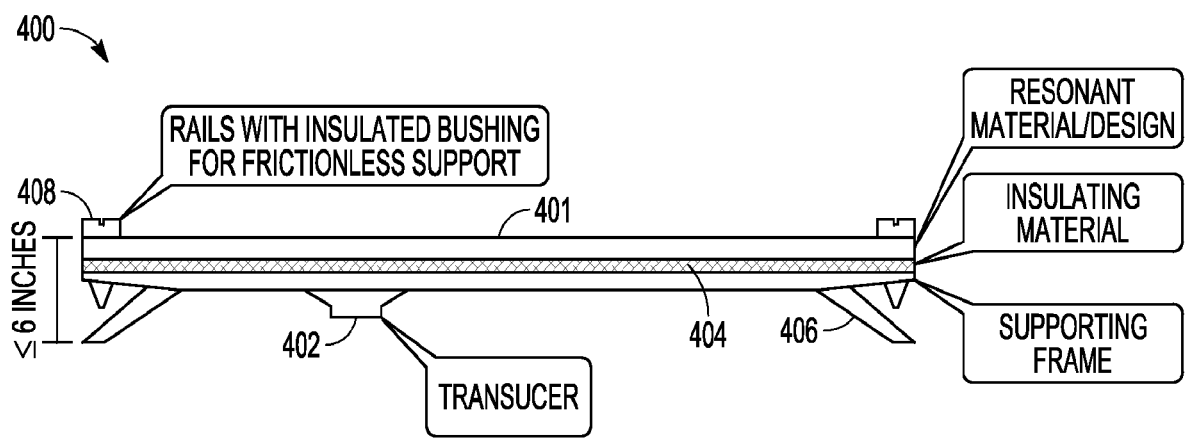
FIG. 4 shows components of a tactile audio system in accordance with some example embodiments.

FIG. 4 shows a panel system 400 according to one example. In the example of FIG. 4, the system 400 is used as a floor, although the invention is not so limited. FIG. 4 shows a transducer 402 coupled to a panel 401, which may be similar to panel 300 from FIG. 3. In one example, an insulating material 404 is included between panel 401 and a supporting frame 406. In one example, rails 408 are included with insulated bushings for frictionless support.

Figure 5:
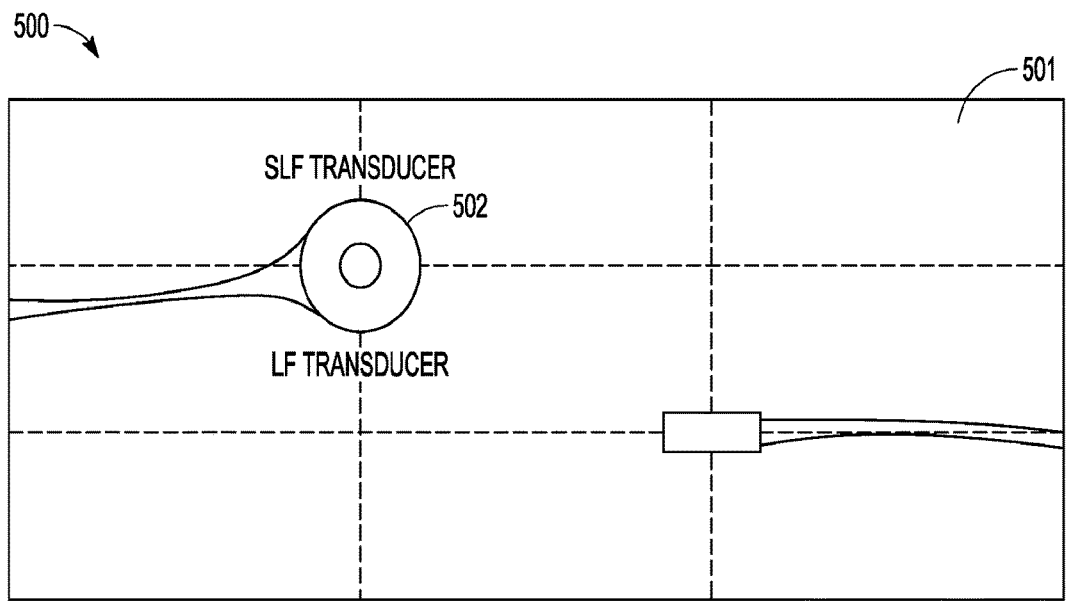
FIG. 5 shows components of a tactile audio system in accordance with some example embodiments.

FIG. 5 shows another panel system 500 according to one example. FIG. 5 shows an example location of transducer 502 on a panel 501. In one example, in order to achieve a good frequency response from the transducer 502 within the panel 501, a location of the transducer 502 is ⅓ of a distance from each end, as illustrated in FIG. 5. Other locations may be optimal for panels or objects of different geometries. The present inventors have discovered that ⅓ of a distance from each end, as illustrated in FIG. 5 provides excellent response for rectangular flat panels as illustrated in FIGS. 3-5.

Figure 6:
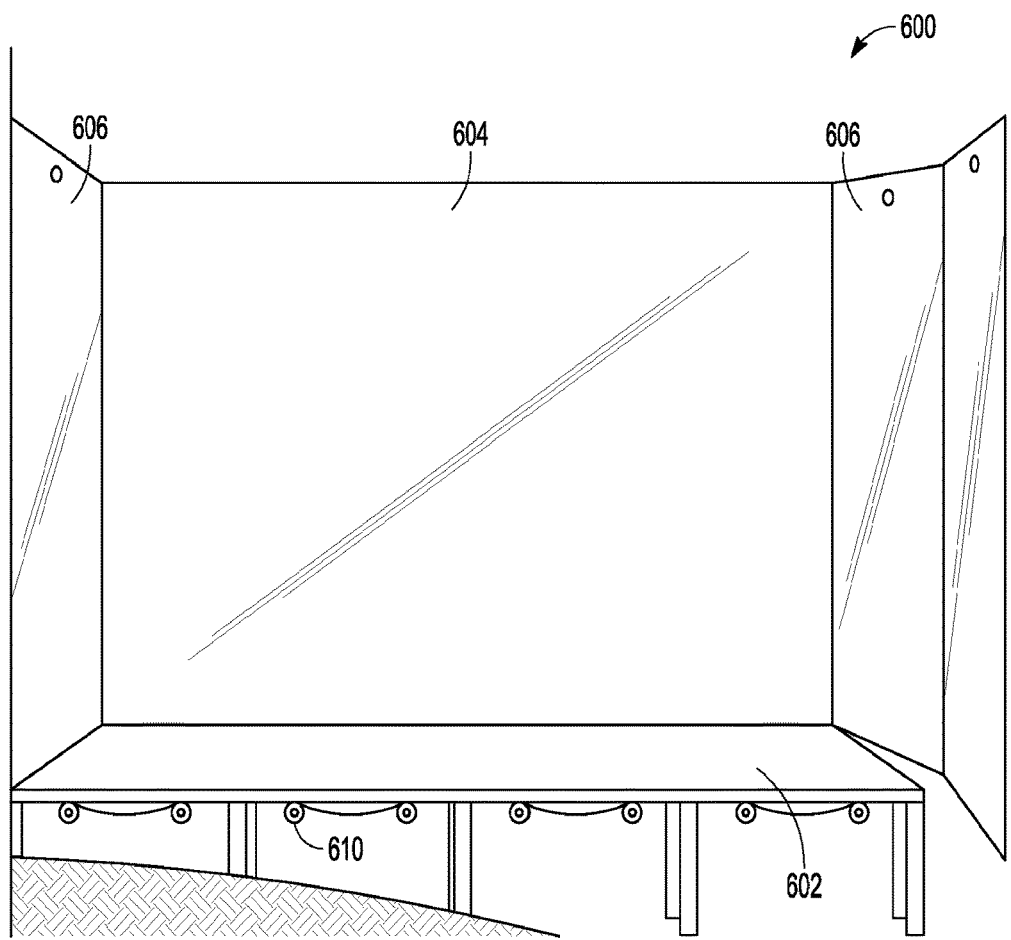
FIG. 6 shows a partially enclosed space and a tactile audio system in accordance with some example embodiments.

FIG. 6 shows a partially enclosed space 600 using panels with transducers as described in the present disclosure. FIG. 6 shows a floor panel 602, a back panel 604, and side panels 606. One or more transducers 601 are shown coupled to one or more of the panels 602, 604, 606. In one example, an immersive tactile experience is provided by the enclosed space 600.

Figure 7:
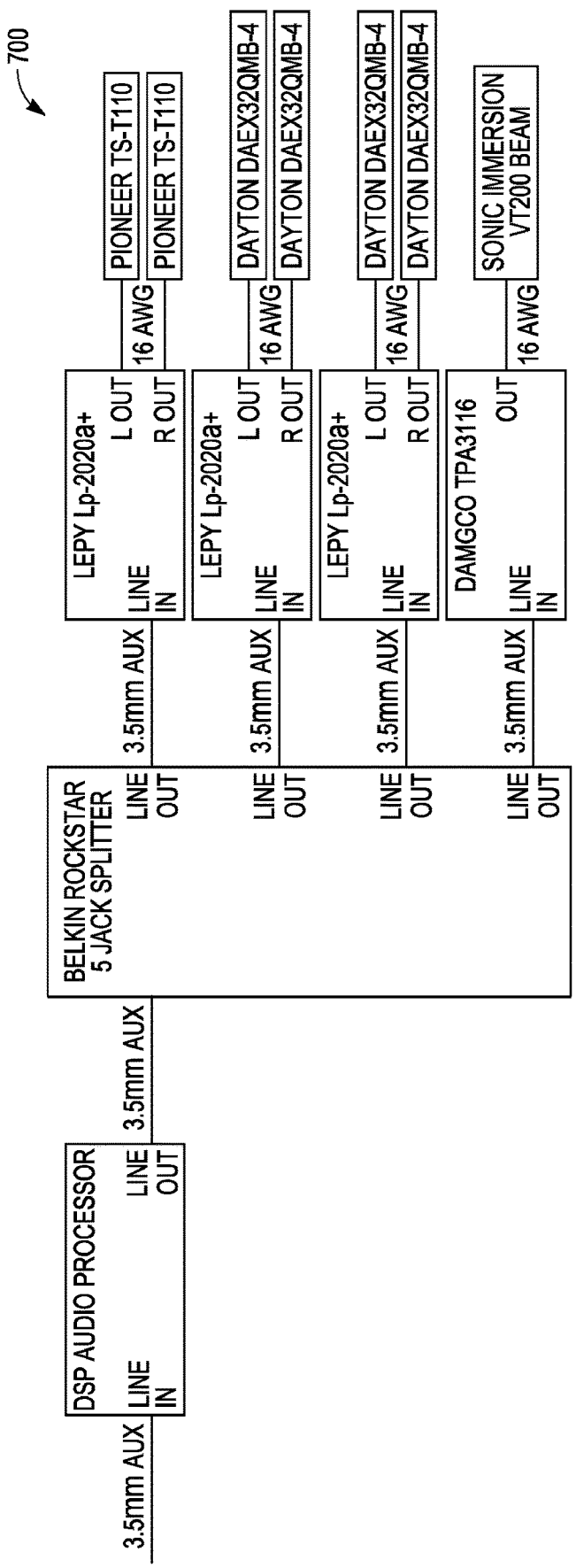
FIG. 7 shows a diagram of a tactile audio system in accordance with some example embodiments.

FIG. 7 shows another example system 700. In FIG. 7, the audio input comes from a 3.5 mm AUX input into a computational audio processor which will run the various audio computational instructions. Once processed, the audio signal enters a 5 way line-level splitter, which will send the signal to different amplifiers. The Lp-2020a+ is a 20 W amplifier with 2 outputs. Each output contains two 16 AWG conductive wires which connect to the positive and negative terminals of the transducer. The first Lp-2020a+ amplifier outputs to two TS-T110 tweeters which handle the high frequencies. The next two Lp-2020a+ amplifiers output to 4 DAEX32QMB-4 exciters which handle mid frequencies. The TPA3116 is a 100 W amplifier which connects two 18 AWG wires to the positive and negative terminals of the IBEAM. The IBEAM is a bass transducer which handles the lowest frequencies and gives low frequency tactile audio sensation.

Figure 8:
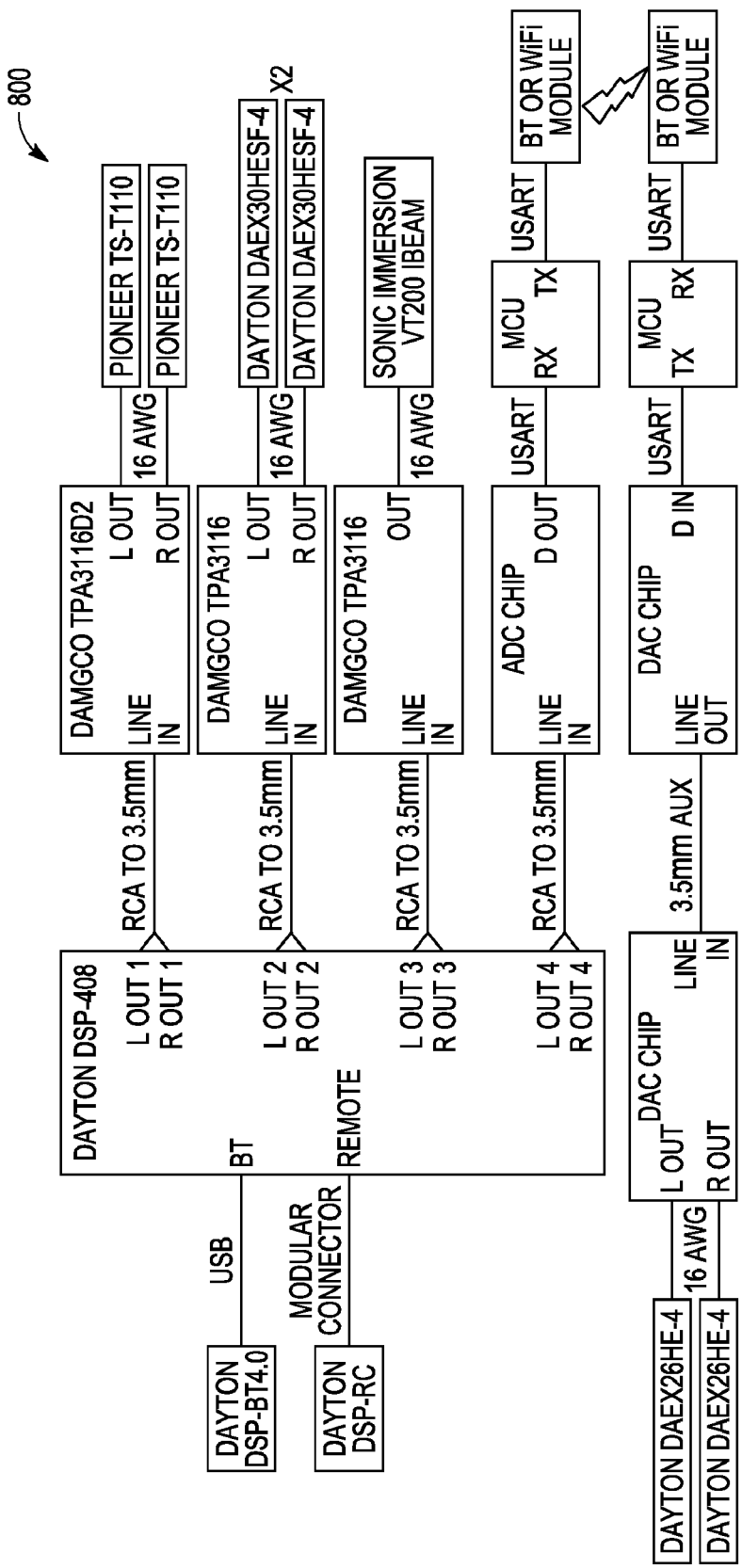
FIG. 8 shows a diagram of a tactile audio system in accordance with some example embodiments.
Figure 9:
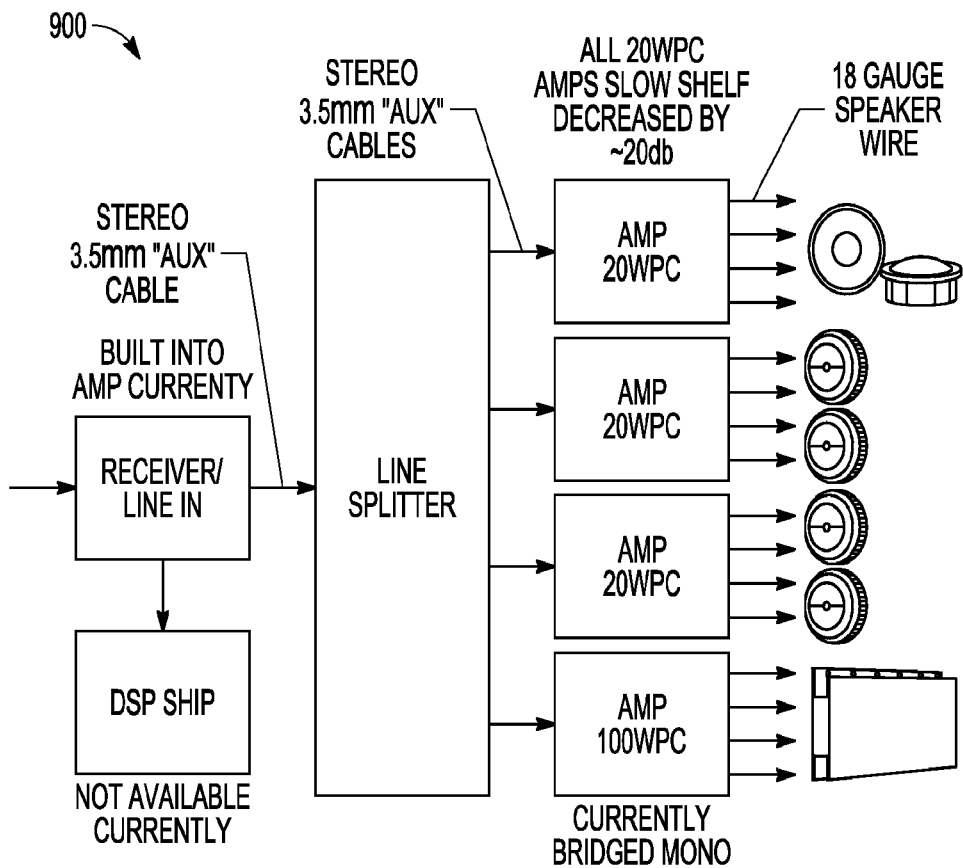
FIG. 9 shows a diagram of a tactile audio system in accordance with some example embodiments.

FIG. 8 shows another example system. In FIG. 8, the system 800 may be implemented into a gaming chair. The DSP-408 will handle the bandpassing and EQ DSP computational instructions. The remote control (RC) and Bluetooth module (BT4.0) allow us to interface with the digital signal processor. This module is powered by 12V. The TPA3116D2 is a 100 W, 24V amplifier which outputs the high frequency sounds to the TS-T110. The TPA3116 is a 200 W, 24V amplifier that outputs wide-band mid frequency ranges to four DAEX30HES-4 tactile exciters, and tactile low frequencies to the IBEAM. The satellite distributed mode loudspeakers (DML) desk monitors driven by the DAEX25FHE-4 modules will communicate wirelessly via Wi-Fi or Bluetooth. In order to do this, an analog to digital converter (ADC) would be needed to convert the analog sound into a digital signal. Once converted, it is passed into a microcontroller unit (MCU) and it is sent to a Wi-Fi or Bluetooth chip. The digital data will travel between modules via USART. Once transmitted wirelessly, the digital data is sent to an MCU and passed on to a digital to analog converter (DAC) which converts the digital signal back to an audio signal to be amplified by another TPA3116D2 is a 100 W, 24V amplifier. FIG. 9 shows another example system 900.

In one example, exciters are attached to a chair, for example a gaming chair. In one example, 4 exciters are attached to the bottom of a chair. In one example, a high-pass filter is coupled to the exciters to avoid over-excursion. In one example, an I-BEAM bass shaker is added, utilizing 3 separate amplifiers—2×20 watt/channel RMS for the front and rear stereo pairs, and a 2×100 watt/channel amplifier, bridged to mono for the bass shaker. This system, when receiving the same signal via a 3.5 mm splitter (through Bluetooth receiver) provides control over tone of exciters, and amount of bass shaking via dedicated amp for bass shaker. In one example, a low-pass filter is included for the bass shaker, so that it does not inefficiently reproduce high frequencies, as well as a stronger high-pass filter so that exciters are not experiencing over-excursion from inefficiently reproducing lower bass frequencies.

In one example, a system includes the upper mid-high frequencies at ear level. In one example, satellite L and R tweeter channels are placed on a desk to provide upper mid-high frequencies at ear level. In one example some or all connections between systems are wireless, for example, Wi-Fi or Bluetooth. Other wireless communication protocols are also within the scope of the invention.

In one example, an I-BEAM is used as the low frequency device. In one example, the alternatives don't have the extended frequency range that the I-BEAM has demonstrated. The I-BEAM is a large exciter that exhibits a strong low frequency range, but other bass-shakers certainly excel in the deep sub-bass frequency ranges as well. In one example, with a 4-ohm I-BEAM in mind, and 4× Exciters for the high frequencies, a passive crossover is implemented at 300 hz @4 ohm since 400 hz can be an unpleasant resonant frequency in gaming chair implementations.

In one example a DSP is included before the amplifier, which have 3 dedicated channels (L+R+Sub) in a custom amplifier. In one example a double number of exciters are included (4 on each side) where the excitation components can be wired in parallel and series, giving 4 ohm nominal load again, allowing to revert back to passive crossover for the time being. A computational audio process provides the ability to digitally set the crossovers, and behaviors for each channel of amplified signal to the transducers.

Although the invention is not so limited, example applications of systems and methods described in the present disclosure, include gaming/entertainment industries—where users would benefit from better frequency response at lower sound pressure levels. Inclusion of tactile components means soft far away sounds (i.e. footsteps) are perceivable sooner. Another example application includes internet of things (IOT) industry—the true 'invisible speaker' can be created by installing this technology inside walls and other home structures so that a user can have whole-home audio with sound emanating from the home itself. Another example application includes Healthcare—Deaf/Hard of Hearing (D/HH) and Intellectual and Developmentally Delayed (IDD) populations have noted benefits from tactile reproduction of sound. Preliminary research findings of tactile pitch perception indicate that better pitch perception can be gained from prototype devices using this technology. Another example application includes extending the frequency response of objects and/or panels, etc. that emanate sound to traditional sound sources as well in live mixing environment.

In one example, a backpack-sized module is provided that can be strapped to back of chair, and deliver full audio range through and around chair. Paired with a small front-facing sound-bar, a multimedia computer station will have a wide frequency response, even at low sound pressure levels, and perceived multichannel audio spatialization effects.

A sound engineer can use the intelligent computational instructions described herein to help assign ideal processing and parameters to a live sound source i.e. piano/guitar/vocal performer. Many instances of the instructions can be used in parallel to process an ensemble consisting of many sound sources. A second layer of the instructions can also help overall mix of complex harmonic sound environment i.e. live band. In one example, the intelligent computational instructions is embodied in standalone software. Standalone software may be encoded on a computer readable medium, such as a CD or DVD ROM. Standalone software may also include computer readable instructions downloaded over the internet that are encoded on an end user's computer or device. In one example the intelligent computational instructions are embodied in a host-dependent plug-in. In one example, the intelligent computational instructions are embodied in a hardware enclosure that is optimized with integrated audio interface and professional input/output options.

Figures 10A, 10B:
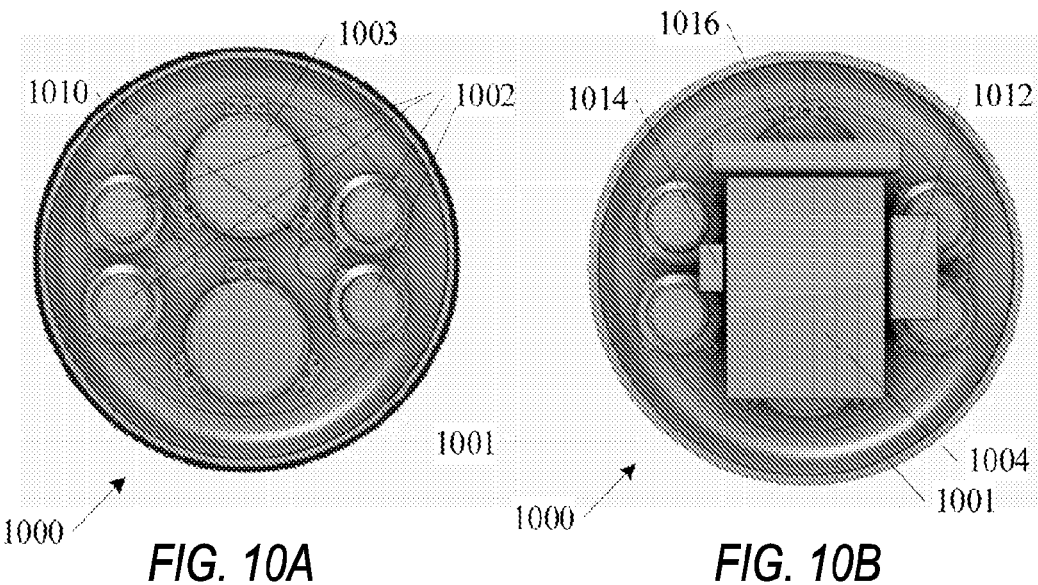
FIG. 10A shows components of a tactile audio system in accordance with some example embodiments.
FIG. 10B shows additional components of the tactile audio system from FIG. 10A in accordance with some example embodiments.

FIGS. 10A and 10B show an additional example of a system 1000 using devices and method of the present disclosure. In FIG. 10A, a housing 1001 is shown with a number of components contained within. A first number of transducers 1002 and a second number of transducers 1003 are shown. In one example, the first number of transducers 1002 are higher frequency transducers, such as mid or high frequency. In one example, the second number of transducers 1003 are lower frequency transducers, such as bass frequency. In one example, at least one sensor 1010 is included. The example of FIG. 10A shows two sensors 1010, although the invention is not so limited. One sensor 1010, or more than two sensors are within the scope of the invention. In one example, the sensors 1010 include piezoelectric sensors. Other sensor types, such as MEMS, etc. are also within the scope of the invention. In one example, the sensors 1010 are used to provide feedback data for computational instructions as described above. The sensors 1010 and computational instructions facilitate adjustment of resonance in an object or panel that transducers or exciters are coupled to.

FIG. 10B shows additional components added to the housing 1001 from FIG. 10A. In one example, an audio processing device 1004 is included. Components that may be housed in the audio processing device 1004 include a signal processor to separate transient and sustained groups from an audio signal. The audio processing device 1004 may also include one or more amplifiers. In one example, an analog to digital convertor (ADC) 1012 is included. In one example, a digital to analog convertor (DAC) 1014 is included. In one example, an input/output (I/O) circuit 1016 is included. In one example one or more components, such as the ADC 1012, DAC 1014 and I/O circuit 1016 may be consolidated into fewer components, or a single board or device enclosure.

Figure 11:
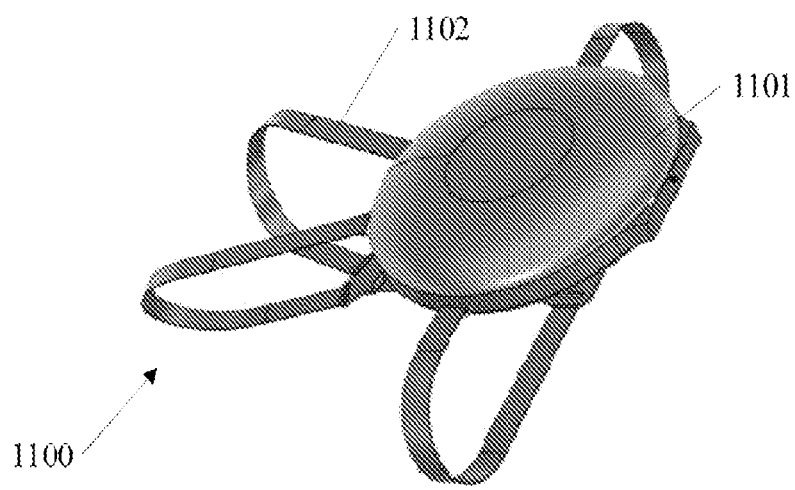
FIG. 11 shows an example form factor of a tactile audio system in accordance with some example embodiments.

FIG. 11 shows system 1100 including a housing 1101 similar to the housing 1001 from FIGS. 10A and 10B. In one example similar components are included in housing 1101 as those in housing 1001. In the example of FIG. 11, the housing 1101 is coupled to one or more straps 1102 to provide a backpack like form factor. In one example, the system 1100 may be worn by an individual directly. In one example, the system 1100 may be attached to an intermediary structure, such as a chair. Although a backpack like form factor is shown as an example, the invention is not so limited. Other structures and form factors may be used to incorporate audio processing devices and transducers as described in examples above.

To better illustrate the method and apparatuses disclosed herein, a non-limiting list of embodiments is provided here:

Example 1 includes a tactile audio system. The system includes an audio processing device configured to separate an audio input into a transient group and a sustained group and a plurality of frequency bands for each of the transient group and the sustained group. The system includes a first number of amplifiers corresponding to one or more of the frequency bands and a second number of transducers coupled to the first number of amplifiers.

Example 2 includes the tactile audio system of example 1, wherein two transducers are coupled to a one amplifier.

Example 3 includes the tactile audio system of any one of examples 1-2, wherein the plurality of frequency bands includes four frequency bands.

Example 4 includes the tactile audio system of any one of examples 1-3, wherein the four frequency bands include one high frequency band, two mid-range bands, and one low frequency band.

Example 5 includes the tactile audio system of any one of examples 1-4, wherein communication of one or more of the plurality of frequency bands between the audio processing device and a transducer is configured to be wireless.

Example 6 includes the tactile audio system of any one of examples 1-5, further including one or more feedback sensors to calibrate a frequency response of a subsequent object attached to one or more of the second number of transducers.

Example 7 includes the tactile audio system of any one of examples 1-6, wherein the audio processing device is configured to compare the frequency response of the subsequent object, compare the frequency response of the subsequent object to a target frequency response, and calculate a calibration filter.

Example 8 includes the tactile audio system of any one of examples 1-7, wherein the calibration filter is an inverse filter.

Example 9 includes the tactile audio system of any one of examples 1-8, wherein the second number of transducers are coupled to a backpack like form factor.

Example 10 includes the tactile audio system of any one of examples 1-9, wherein the second number of transducers are coupled to a floor panel.

Example 11 includes the tactile audio system of any one of examples 1-10, wherein the second number of transducers are coupled to a wall panel.

Example 12 includes the tactile audio system of any one of examples 1-11, further including one or more audio speakers to augment the tactile response from the second number of transducers.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended examples, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The invention claimed is:

1. A tactile audio system, comprising:
   an audio processing device configured to separate an audio input into:
   a transient group and a sustained group;
   a plurality of frequency bands for each of the transient group and the sustained group;
   a first number of amplifiers corresponding to one or more of the frequency bands;
   a second number of transducers coupled to the first number of amplifiers;
   a first volume adjustment configured to receive signals from the transient group and a second volume adjustment configured to receive signals from the sustained group; and
   a digital signal processor to combine outputs from the first volume adjustment and the second volume adjustment after a selection of a transient volume and a sustained volume.

2. The tactile audio system of claim 1, wherein two transducers are coupled to one amplifier.

3. The tactile audio system of claim 1, wherein the plurality of frequency bands includes four frequency bands.

4. The tactile audio system of claim 3, wherein the four frequency bands include one high frequency band, two mid-range bands, and one low frequency band.

5. The tactile audio system of claim 1, wherein communication of one or more of the plurality of frequency bands between the audio processing device and a transducer is configured to be wireless.

6. The tactile audio system of claim 1, further including one or more feedback sensors to calibrate a frequency response of a subsequent object attached to one or more of the second number of transducers.

7. The tactile audio system of claim 6, wherein the audio processing device is configured to compare the frequency response of the subsequent object, compare the frequency response of the subsequent object to a target frequency response, and calculate a calibration filter.

8. The tactile audio system of claim 7, wherein the calibration filter is an inverse filter.

9. The tactile audio system of claim 1, wherein the second number of transducers are coupled to a backpack like form factor.

10. The tactile audio system of claim 1, wherein the second number of transducers are coupled to a floor panel.

11. The tactile audio system of claim 1, wherein the second number of transducers are coupled to a wall panel.

12. The tactile audio system of claim 1, further including one or more audio speakers to augment a tactile response from the second number of transducers.

13. The tactile audio system of claim 1, further including:
   one or more vibration sensors; and
   feedback circuitry coupled to the first number of amplifiers, the second number of transducers, and the one or more vibration sensors, the feedback circuitry configured to vary signals to the first number of amplifiers and the second number of transducers based on information from the one or more vibration sensors.

* * * * *